United States Patent [19]
Haruyama

[11] Patent Number: 6,097,569
[45] Date of Patent: *Aug. 1, 2000

[54] MAGNETIC DISK DRIVE WITH AIR FILTRATION

[75] Inventor: Hiroyuki Haruyama, Tokyo, Japan

[73] Assignee: NEC Corporation, Tokyo, Japan

[*] Notice: Under 35 U.S.C. 154(b), the term of this patent shall be extended for 1082 days.

[21] Appl. No.: 08/572,195

[22] Filed: Dec. 14, 1995

Related U.S. Application Data

[63] Continuation of application No. 08/364,386, Dec. 23, 1994, abandoned, which is a continuation of application No. 08/172,238, Dec. 23, 1993, abandoned.

[30] Foreign Application Priority Data

Dec. 28, 1992 [JP] Japan ................................. 4-361056

[51] Int. Cl.[7] .................................................. G11B 33/14
[52] U.S. Cl. .......................................................... 360/97.03
[58] Field of Search .............................. 360/97.02, 97.03, 360/97.01, 97.04, 98.01, 98.02

[56] References Cited

U.S. PATENT DOCUMENTS

| | | | |
|---|---|---|---|
| 4,594,626 | 6/1986 | Fraugesh .............................. | 360/97.02 |
| 4,857,087 | 8/1989 | Bolton et al. ........................ | 360/97.02 |
| 4,888,655 | 12/1989 | Bonn .................................. | 360/97.03 |
| 5,034,835 | 7/1991 | Yokoyama ........................... | 360/97.02 |
| 5,134,530 | 7/1992 | Hall .................................... | 360/97.03 |
| 5,140,578 | 8/1992 | Tohkairin ............................ | 360/97.03 |
| 5,270,887 | 12/1993 | Edwards et al. ..................... | 360/97.03 |

FOREIGN PATENT DOCUMENTS

| | | | |
|---|---|---|---|
| 57-74868 | 5/1982 | Japan ................................. | 360/97.02 |
| 61-151892 | 7/1986 | Japan ................................. | 360/97.02 |
| 62-97195 | 5/1987 | Japan ................................. | 360/97.02 |
| 63-157389 | 6/1988 | Japan . | |
| 2-79287 | 3/1990 | Japan . | |
| 4-285787 | 10/1992 | Japan . | |

OTHER PUBLICATIONS

Patent Abstracts of Japan, vol. 13, No. 329, Apr. 12, 1989, "Air Filter", 1–92987.
Patent Abstracts of Japan, vol. 10, No. 330, Jun. 23, 1986, "Magnetic Disk Device", 61–134980.
Patent Abstracts of Japan, vol. 13, No. 54, Oct. 11, 1988, "Information Processor". 63–244474.
Patent Abstracts of Japan, vol. 10, No. 353, Jul. 10, 1986, "Magnetic Disk Device". 61–151893.
Patent Abstracts of Japan, vol. 11, No. 26, Aug. 30, 1986, "Magnetic Disk Device" 61–196494.
Patent Abstracts of Japan, vol. 11, No. 248, Mar. 10, 1987, "Magnetic Disk Device" 62–54888.
Patent Abstracts of Japan, vol. 11, No. 29, Sep. 2, 1986, "Magnetic Disk Device". 61–198485.
Patent Abstracts of Japan, vol. 14, No. 333, Apr. 25, 1990, "Magnetic Disk Device". 2–113485.

*Primary Examiner*—David L. Ometz
*Attorney, Agent, or Firm*—Sughrue, Mion, Zinn, Macpeak & Seas, PLLC

[57] ABSTRACT

A magnetic disk drive capable of preventing dust-containing air from standing around the inner periphery of a magnetic disk. The disk spins in a such a manner as to move from a magnetic head toward a head drive section so as to prevent dust-containing air from standing around a spindle. A stream of air flows along an arm supporting the head. A filter or filters are located on the path along which air flows, thereby removing dust efficiently.

12 Claims, 5 Drawing Sheets

MAGNETIC DISK DRIVE WITH AIR FILTRATION

This is a Continuation Application of application Ser. No. 08/364,386 filed on Dec. 23, 1994, now abandoned, which is a Continuation Application of application Ser. No. 08/172,238, filed on Dec. 23, 1993, now abandoned.

BACKGROUND OF THE INVENTION

The present invention relates to a magnetic disk drive and, more particularly, to a magnetic disk drive capable of preventing dust-containing air from standing around the inner periphery of a magnetic disk.

It is a common practice with a magnetic disk drive to support a magnetic head on an arm and move the head substantially in the radial direction of a disk mounted on a spindle. As the disk spins, a stream of air is generated between the disk and the head to cause the head to float a small distance away from the disk. In this condition, desired data is recorded in or reproduced from the disk.

However, the conventional disk drive described above has a problem that since the stream of air is generated at the side where the arm supporting the head is located, it entangles dust existing between the head and the disk and in the vicinity of a positioner therein while flowing toward the inner periphery of the disk, i.e., toward the spindle. As such dust-containing air stands around the spindle, while dust is apt to deposit on the disk and is likely to damage it particularly when the disk drive is started up. Another problem is that the dust cannot be removed efficiently since the head is moved by the arm substantially in the radial direction of the disk, changing the path of the air stream every moment.

To absorb the dust around the disk, there has been proposed to arrange an electrostatic filter or similar implement around the spindle, as taught in, for example, Japanese Utility Model Laid-Open Publication (Kokai) No. 62-61099 and Japanese Patent Laid-Open Publication No. 2-185785. However, even the filter scheme is not fully satisfactory since the relative position of the head to the disk in the radial direction of the disk changes, changing the path along which air flows.

SUMMARY OF THE INVENTION

It is, therefore, an object of the present invention to provide a reliable magnetic disk drive which maintains the interior thereof clean at all times to insure a desirable data recording and reproducing characteristic.

It is another object of the present invention to provide a magnetic disk drive which prevents dust-containing air from standing around the inner periphery of a magnetic disk.

It is a further object of the present invention to provide a magnetic disk drive capable of removing dust efficiently despite that the path of air flow changes with the position of a magnetic head.

A magnetic disk drive of the present invention has a plurality of magnetic disks mounted on a spindle at equally spaced locations on the axis of the spindle and driven to spin by the spindle. A plurality of magnetic heads each faces a respective magnetic disk for selectively writing or reading data in or out of the disk. The magnetic heads are each caused to float a predetermined distance away from the respective magnetic disk by a stream of air generated by the relative movement of the head and the disk. A plurality of arms each supports a respective magnetic head. A head drive section drives each of the arms in a rotary motion. The disks each spin in such a manner as to move from the respective magnetic head toward the head drive section. As a result, the stream of air is generated at the side adjoining the end of the head.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 5:
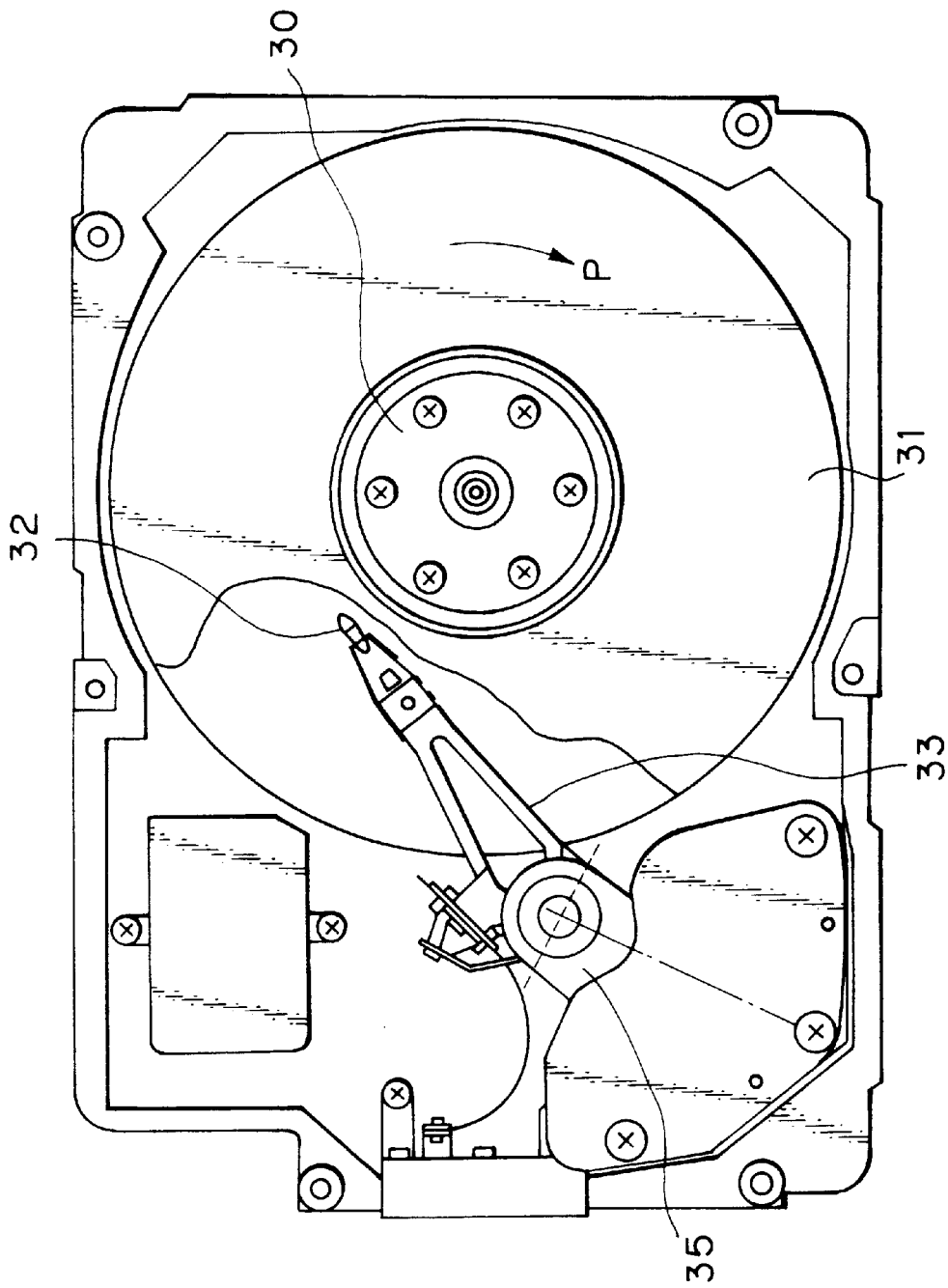
FIG. 5 is a plan view of a conventional magnetic disk drive.

To better understand the present invention, a brief reference will be made to a conventional magnetic disk drive, shown in FIG. 5. As shown, the disk drive has a spindle 30 driven by a motor, not shown, magnetic disks 31 mounted on the spindle 30 at equally spaced locations along the axis of the spindle 30, magnetic heads 32 each facing a respective disks 31, arms 33 each supporting a respective head 32, and head drive sections 35 each rotating a respective arm 33 to thereby move the associated head 32 substantially in the radial direction of the disk 31. In this configuration, each disk 31 is caused to spin clockwise by the spindle 30, as indicated by an arrow P in the figure. As a result, a stream of air is generated between the disk 31 and the associated head 32 to cause the head 32 to float a small distance away from the disk 31. In this condition, desired data is recorded in or reproduced from the disk 31.

However, the conventional disk drive described above has some problems left unsolved, as discussed earlier. Specifically, the stream of air is generated at the side where the arm 33 supporting the head 32 is located. Consequently, the air stream entangles dust existing between the head 3 2 and the disk 31 and in the vicinity of a positioner, not shown, therein while flowing toward the inner periphery of the disk 31, i.e., toward the spindle 30. As such dust-containing air stands around the spindle 30, the dust is apt to deposit on the disk 31 and is likely to damage it particularly when the disk drive is started up. Moreover, the head 32 is moved by the arm 33 substantially in the radial direction of the disk 31, changing the path of the air stream every moment. This prevents the dust from being removed efficiently. To absorb the dust around the disk 31, there has been proposed to arrange an electrostatic filter or similar implement around the spindle 30. However, even this kind of implement cannot remove the dust satisfactorily.

Figure 1:
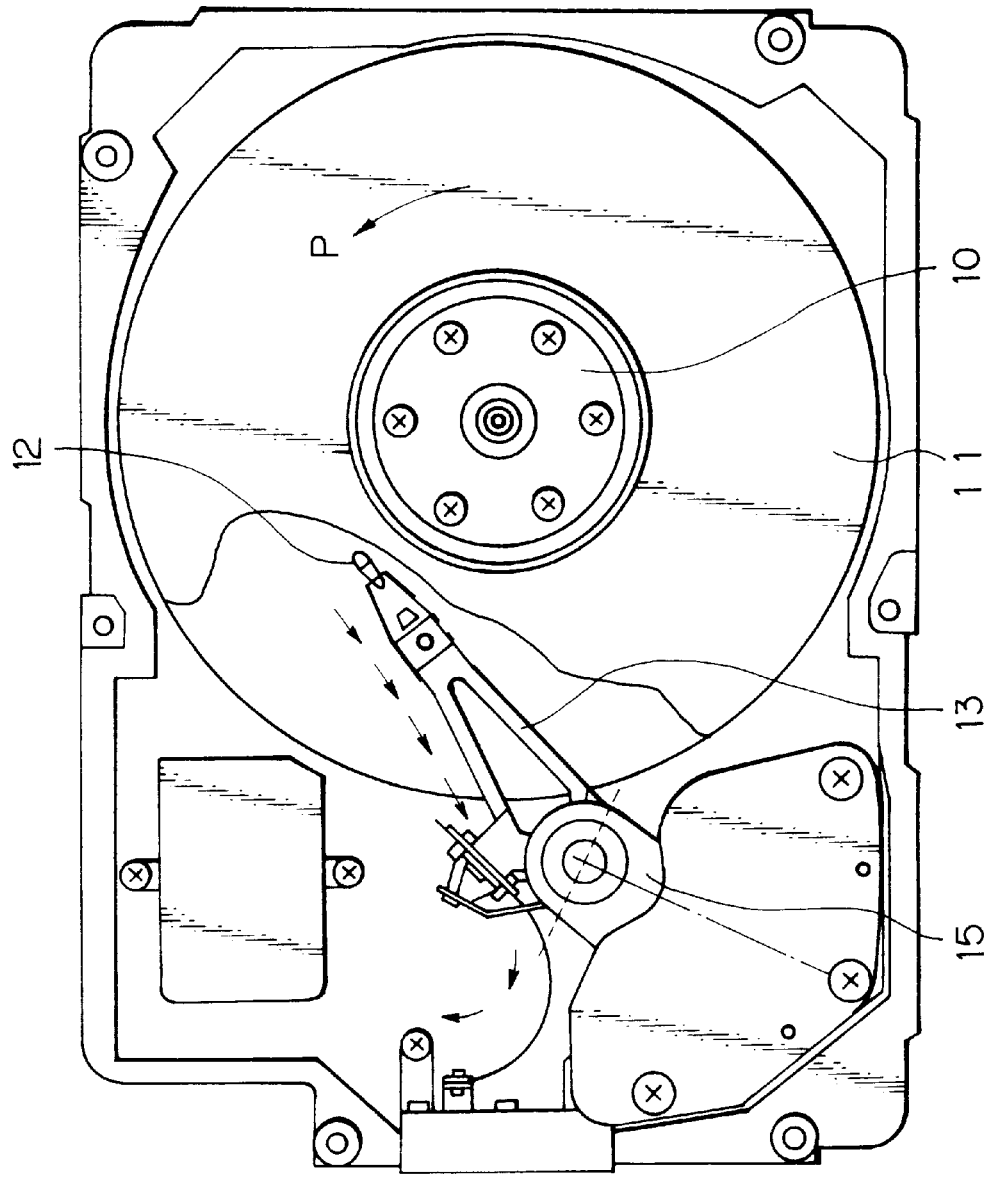
FIG. 1 is a plan view of a magnetic disk drive embodying the present invention.

Referring to FIG. 1, a magnetic disk drive embodying the present invention will be described which is free from the problems discussed above. As shown, magnetic disks 11 are securely mounted on a spindle 10 at equally spaced locations along the axis of the spindle 10. Magnetic heads 12 are each positioned to face a respective disk 11 and supported by a respective arm 13. The arm 13 is driven by a respective head drive section 15 to move the associated head 12 substantially in the radial direction of the disk 11. In the illustrative embodiment, the disk 11 spins counterclockwise, as indicated by an arrow P in the figure. As a result, a stream of air is generated between the disk 11 and the head 12 to cause the head 12 to float a small distance away away from the disk 11. In this condition, desired data is recorded in or reproduced from the disk 11. Since the disk 11 spins counterclockwise, the stream of air is generated at the side where the tip of the head 12 is located, i.e., at the side remote from the head drive section 15. Consequently, the air stream flows from the head 12 toward the head drive section 15, entraining dust existing between the head 12 and the disk 11 along the arm 13. This is successful in preventing air containing dust from standing around the inner periphery of the disk 11.

Figure 2:
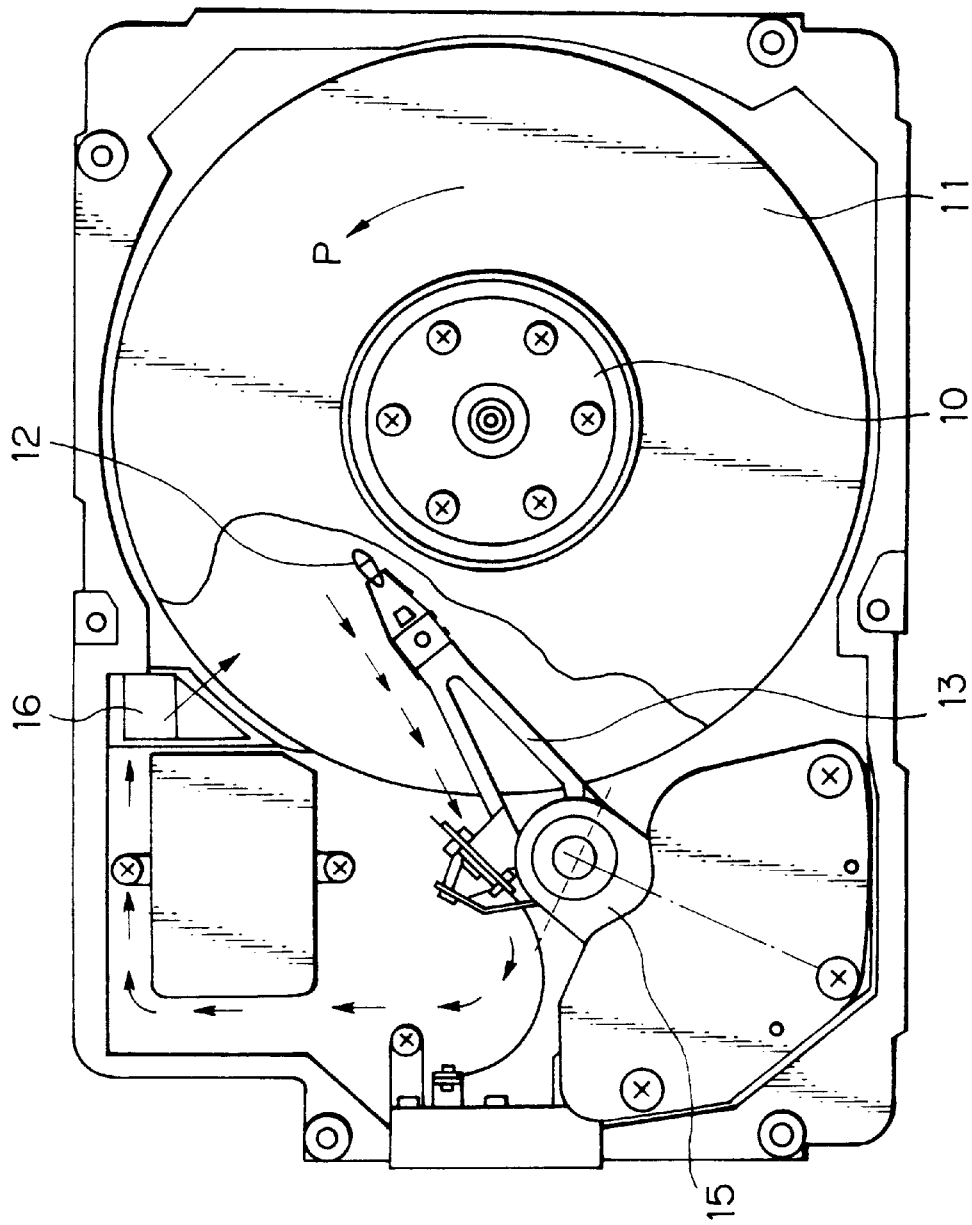
FIG. 2 is a plan view showing an alternative embodiment of the present invention.

FIG. 2 shows an alternative embodiment of the present invention. In the figure, the same constituents as the constituents shown in FIG. 1 are designated by the same reference numerals, and a detailed description thereof will not be made in order to avoid redundancy. As shown, this embodiment includes an electrostatic filter, or small pressure loss filter, 16 located on the path along which the stream of air flows, as described in relation to the previous embodiment. The filter 16 is capable of collecting even dust floating in air since it is implemented by an intertwined structure of filaments which are weakly statically electrified. Further, since the filter 16 has only small pressure loss, a great amount of air is allowed to flow therethrough, promoting efficient dust collection.

Figure 3:
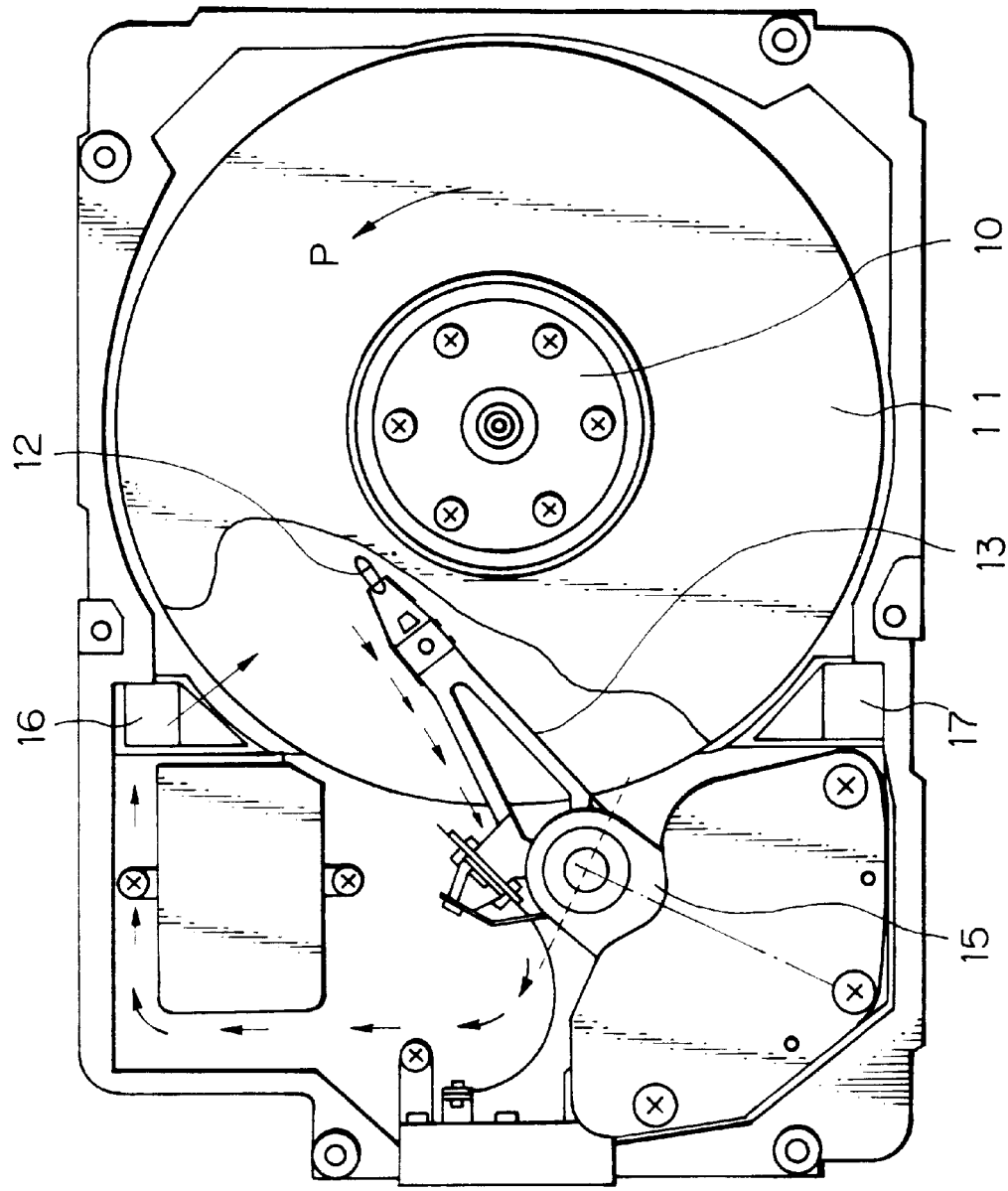
FIGS. 3 and 4 are plan views showing another alternative embodiment of the present invention.
Figure 4:
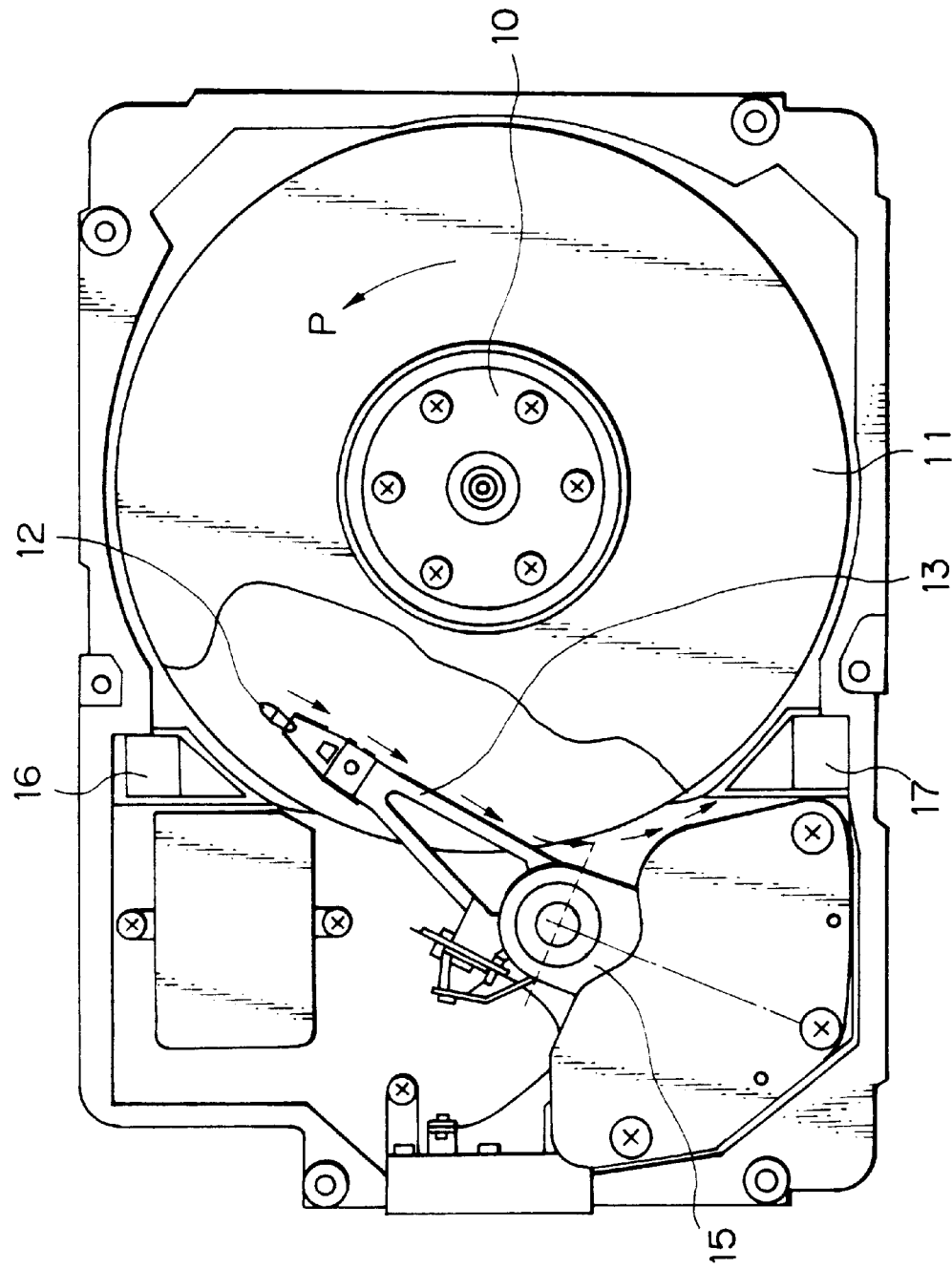

Another alternative embodiment of the present invention will be described with reference to FIGS. 3 and 4. In the figure, the same constituents as the constituents shown in FIG. 2 are designated by the same reference numerals, and a detailed description thereof will not be made in order to avoid redundancy. FIGS. 3 and 4 are respectively indicative of a condition wherein the head 12 adjoins the inner periphery of the disk 11 and a condition wherein it adjoins the outer periphery of the disk 11. In the condition shown in FIG. 3, air flows along the side of the disk 11 remote from the spindle 10 while, in the condition shown in FIG. 4, it flows along the other side of the disk 11 which faces the spindle 10. As a result, the path along which air flows changes, following a change in the position of the head 12. In this embodiment, another electrostatic filter 17 is located on the path along which air flows when the head 12 adjoins the outer periphery of the disk 11, as shown in FIG. 4. With this embodiment, it is possible to remove dust even more positively than with the previous embodiments.

In summary, it will be seen that the present invention provides a magnetic disk drive which prevents air containing dust from standing around the inner periphery of a magnetic disk, and removes dust efficiently despite that the path along which air flows changes with the position of a magnetic head. Hence, the interior of the disk drive remains clean at all times, insuring reliable recording and reproduction of data.

Various modifications will become possible for those skilled in the art after receiving the teachings of the present disclosure without departing from the scope thereof.

What is claimed is:

1. A magnetic disk drive comprising:
   a plurality of magnetic disks mounted on a spindle at equally spaced location on an axis of said spindle and driven to spin by said spindle;
   a plurality of magnetic heads each facing a respective magnetic disk for selectively writing or reading data in or out of said magnetic disk, said plurality of magnetic heads each being caused to float a predetermined distance away from said respective magnetic disk by a stream of air generated by relative movement of said magnetic head and said magnetic disk;
   a plurality of arms each supporting a respective magnetic head;
   a plurality of head drive means including a pivot, each for driving a respective one of said plurality of arms in a rotary motion about said pivot, said plurality of magnetic disks each spinning in a direction such that a stream of air generated at a side adjoining an end of each magnetic head moves from its respective magnetic head, past its respective arm, and toward its respective head drive means, in that order; and
   at least one filter disposed proximate to a respective said magnetic disk on a path along which the stream of air flows after being directed by said arms and head drive means past the pivot of said head drive means without being directed around the head drive means.

2. A magnetic disk drive as claimed in claim 1, wherein said stream of air generated at each said magnetic head flows from said each magnetic head toward said head drive means along a respective said arm to sweep dust off of said respective magnetic disk.

3. A magnetic disk drive as claimed in claim 1, wherein the magnetic heads are each attached to their respective arm in an in-line configuration.

4. A magnetic disk drive as claimed in claim 1, wherein said head drive means are disposed to prevent said stream of air from passing around a back of said head drive means which faces away from said magnetic disks.

5. A magnetic disk drive as claimed in claim 4, wherein said head drive means are disposed to direct said stream of air back towards said magnetic disks without allowing said stream of air to pass around said head drive means.

6. A magnetic disk drive as claimed in claim 5, further comprising a wall, said head drive means being disposed adjacent to said wall to direct said stream of air back towards said magnetic discs without allowing said stream of air to pass between said wall and said head drive means.

7. A magnetic disk drive as claimed in claim 5, wherein said head drive means prevents said stream of air from passing therethrough when directing said stream of air back towards said magnetic disks.

8. A magnetic disk drive comprising:
   a plurality of magnetic disks mounted on a spindle at equally spaced locations on an axis of said spindle and driven to spin by said spindle;
   a plurality of magnetic heads each facing a respective magnetic disk for selectively writing or reading data in or out of said magnetic disk, said plurality of magnetic heads each being caused to float a predetermined distance away from said respective magnetic disk by a stream of air generated by relative movement of said magnetic head and said magnetic disk;
   a plurality of arms each supporting a respective magnetic head;
   a plurality of head drive means including a pivot, each for driving a respective one of said plurality of arms in a rotary motion about said pivot, said plurality of magnetic disks each spinning in a direction such that a stream of air generated at a side adjoining an end of each magnetic head moves from its respective magnetic head, past its respective arm, and toward its respective head drive means, in that order; and
   a pair of filters respectively located on paths along which the stream of air, directed by said arms and said head drive means, flows without being directed around the head drive means after passing said pivot when said magnetic head is located at an inner periphery of said magnetic disk and at an outer periphery of said magnetic disk.

9. A magnetic disk drive as claimed in claim 8, wherein said head drive means are disposed to prevent said stream of air from passing around said head drive means.

10. A magnetic disk drive as claimed in claim 9, wherein said head drive means are disposed to direct said stream of air back towards said magnetic discs without allowing said stream of air to pass around said head drive means.

11. A magnetic disk drive as claimed in claim 10, further comprising a wall, said head drive means being disposed adjacent to said wall to direct said stream of air back towards said magnetic discs without allowing said stream of air to pass between said wall and said head drive means.

12. A magnetic disk drive as claimed in claim 10, wherein said head drive means prevents said stream of air from passing therethrough when directing said stream of air back towards said magnetic disks.

* * * * *